United States Patent
Saarinen

(10) Patent No.: US 6,619,420 B1
(45) Date of Patent: Sep. 16, 2003

(54) RACK AND PINION STEERING GEAR WITH HYDRAULIC YOKE ASSEMBLY

(75) Inventor: John Saarinen, Washington, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 10/123,655

(22) Filed: Apr. 16, 2002

(51) Int. Cl.[7] .............................. B62D 3/12; B62D 5/06; F16H 1/04
(52) U.S. Cl. ...................... 180/428; 180/423; 180/441; 74/422
(58) Field of Search ................................ 180/417, 421, 180/422, 423, 441, 428; 74/409, 422

(56) References Cited

U.S. PATENT DOCUMENTS

| | | |
|---|---|---|
| 3,897,845 A | 8/1975 | Von Lowis of Menar |
| 4,640,148 A | 2/1987 | Hasegawa |
| 4,691,583 A | 9/1987 | Taig |
| 5,802,919 A | 9/1998 | Phillips |
| 5,906,138 A | 5/1999 | Kostrzewa |
| 6,145,400 A | * 11/2000 | Garza .......................... 74/422 |

* cited by examiner

Primary Examiner—Kevin Hurley
(74) Attorney, Agent, or Firm—Tarolli, Sundheim, Covell & Tummino L.L.P.

(57) ABSTRACT

An apparatus (10) for turning steerable wheels of a vehicle comprises a housing (12). A rack bar (54) is movable longitudinally relative to the housing (12) for turning the steerable wheels. A pinion gear (68) is located within the housing (12). Teeth (76) of the pinion gear (68) are in meshing engagement with teeth of the rack bar (54). The apparatus (10) also comprises a hydraulic motor (60) for moving the rack bar (54) relative to the housing (12). A valve assembly (98), responsive to rotation of a steering wheel (94) for directing fluid to the hydraulic motor (60), has an actuated position and an unactuated position. The apparatus (10) further comprises a mechanism (156) for dampening longitudinal oscillations of the rack bar (54). The mechanism (156) comprises a yoke bearing (158) which contacts the rack bar (54) with a variable pressure that is dependent upon a velocity of rack bar (54) relative to the housing (12).

22 Claims, 5 Drawing Sheets

RACK AND PINION STEERING GEAR WITH HYDRAULIC YOKE ASSEMBLY

TECHNICAL FIELD

The present invention relates to rack and pinion steering gears and, more particularly, to hydraulic power-assisted rack and pinion steering gears.

BACKGROUND OF THE INVENTION

A known rack and pinion steering gear includes a pinion gear that is rotatably mounted in a housing and is connectable with a steering wheel of a vehicle. A rack bar extends through the housing and has opposite end portions that are connectable with steerable vehicle wheels. The rack bar is moves longitudinally relative to the housing for turning the steerable wheels of the vehicle. Gear teeth formed on the rack bar are disposed in meshing engagement with gear teeth on the pinion gear. A hydraulic motor, when actuated, assists in moving the rack bar longitudinally relative to the housing. A yoke assembly is disposed in the housing to support and guide movement of the rack bar relative to the housing. The yoke assembly includes a yoke bearing having an arcuate surface across which the rack bar moves. A spring biases the yoke bearing against the rack bar.

When the hydraulic motor is actuated to move the rack bar to a desired position relative to the housing, hydraulic fluid exerts a force in a first direction on a piston that is attached to the rack bar. The force causes the rack bar to move in the first direction toward the desired position. An inertial force of the rack bar, when the rack bar is moving toward the desired position relative to the housing, tends to cause the rack bar to overshoot the desired position. When the rack bar overshoots the desired position, the hydraulic motor is actuated to apply a force in a second direction, opposite the first direction, to move the rack bar back toward the desired position. Again, the rack bar tends to overshoot the desired position and the hydraulic motor is again actuated to move the rack bar in the first direction. As a result, the rack bar continues to oscillate past the desired position. Oscillation of the rack bar past the desired position may produce a rattling noise or a small twitch in the steering wheel that may be felt by the driver. This is especially true when the vehicle contacts a discontinuity in the road surface, such as a pothole, that causes a reaction in the vehicle suspension that removes the resistance to rack movement. When the resistance to rack movement is removed, the velocity of rack movement increases and the magnitude of the overshoot increases.

A rack and pinion steering gear that dampens the movement of the rack bar to eliminate or reduce the overshoot that result from movement of the rack bar toward the desired position is desirable. By dampening movement of the rack bar, the rattling noise and the twitch may be eliminated.

SUMMARY OF THE INVENTION

The present invention is an apparatus for turning steerable wheels of a vehicle in response to rotation of a steering wheel. The apparatus comprises a housing. A rack bar is movable longitudinally relative to the housing for turning the steerable wheels. The rack bar has a portion that extends through the housing and opposite ends that are connectable to the steerable wheels. The portion that extends through the housing includes teeth. A pinion gear is located within the housing and includes teeth. Teeth of the pinion gear are in meshing engagement with teeth of the rack bar. The apparatus also comprises a hydraulic motor for, when actuated, moving the rack bar relative to the housing. A valve assembly is responsive to rotation of the steering wheel for directing fluid to the hydraulic motor. The valve assembly has an actuated position for actuating the hydraulic motor and an unactuated position for discontinuing operation of the hydraulic motor. The apparatus further comprises a mechanism for dampening longitudinal oscillations of the rack bar. The mechanism comprises a yoke bearing which contacts the rack bar with a variable pressure that is dependent upon a velocity of rack bar movement relative to the housing.

In a further aspect of the invention, the apparatus comprises a housing. A rack bar is movable longitudinally relative to the housing for turning the steerable wheels. The rack bar has a portion that extends through the housing and opposite ends that are connectable to the steerable wheels. The portion that extends through the housing includes teeth. A pinion gear is located within the housing and includes teeth. Teeth of the pinion gear are in meshing engagement with teeth of the rack bar. The apparatus also comprises a hydraulic motor for, when actuated, moving the rack bar from an initial position relative to the housing to a desired position relative to the housing in response to rotation of the steering wheel and a yoke assembly for supporting and guiding the rack bar relative to the housing. The yoke assembly includes a pressure chamber and a yoke bearing. The yoke bearing contacts the rack bar on a side of the rack bar opposite the pinion gear. Friction between the yoke bearing and the rack bar increases in response to an increase in fluid pressure in the pressure chamber. The apparatus further comprises a fluid source for supplying fluid to the pressure chamber of the yoke assembly. The fluid source increases fluid pressure in the pressure chamber in response to movement of the rack bar relative to the housing toward the desired position.

In yet a further aspect of the invention, the apparatus comprises a housing. A rack bar is movable longitudinally relative to the housing for turning the steerable wheels. The rack bar has a portion that extends through the housing and opposite ends that are connectable to the steerable wheels. The portion that extends through the housing includes teeth. A pinion gear is located within the housing and includes teeth. Teeth of the pinion gear are in meshing engagement with teeth of the rack bar. The apparatus also comprises a hydraulic motor for, when actuated, moving the rack bar relative to the housing. A valve assembly is responsive to rotation of the steering wheel for directing fluid to the hydraulic motor. The valve assembly has an actuated position for actuating the hydraulic motor and an unactuated position for discontinuing operation of the hydraulic motor. The apparatus further includes a yoke assembly for supporting and guiding the rack bar relative to the housing. The yoke assembly includes a pressure chamber and a yoke bearing. The pressure chamber receives fluid from the valve assembly. The yoke bearing contacts the rack bar on a side of the rack bar opposite the pinion gear. Friction between the yoke bearing and the rack bar increases as fluid pressure in the pressure chamber increases. Fluid pressure in the pressure chamber increases in response to movement of the valve assembly from the actuated position toward the unactuated position.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENT

Figure 1:
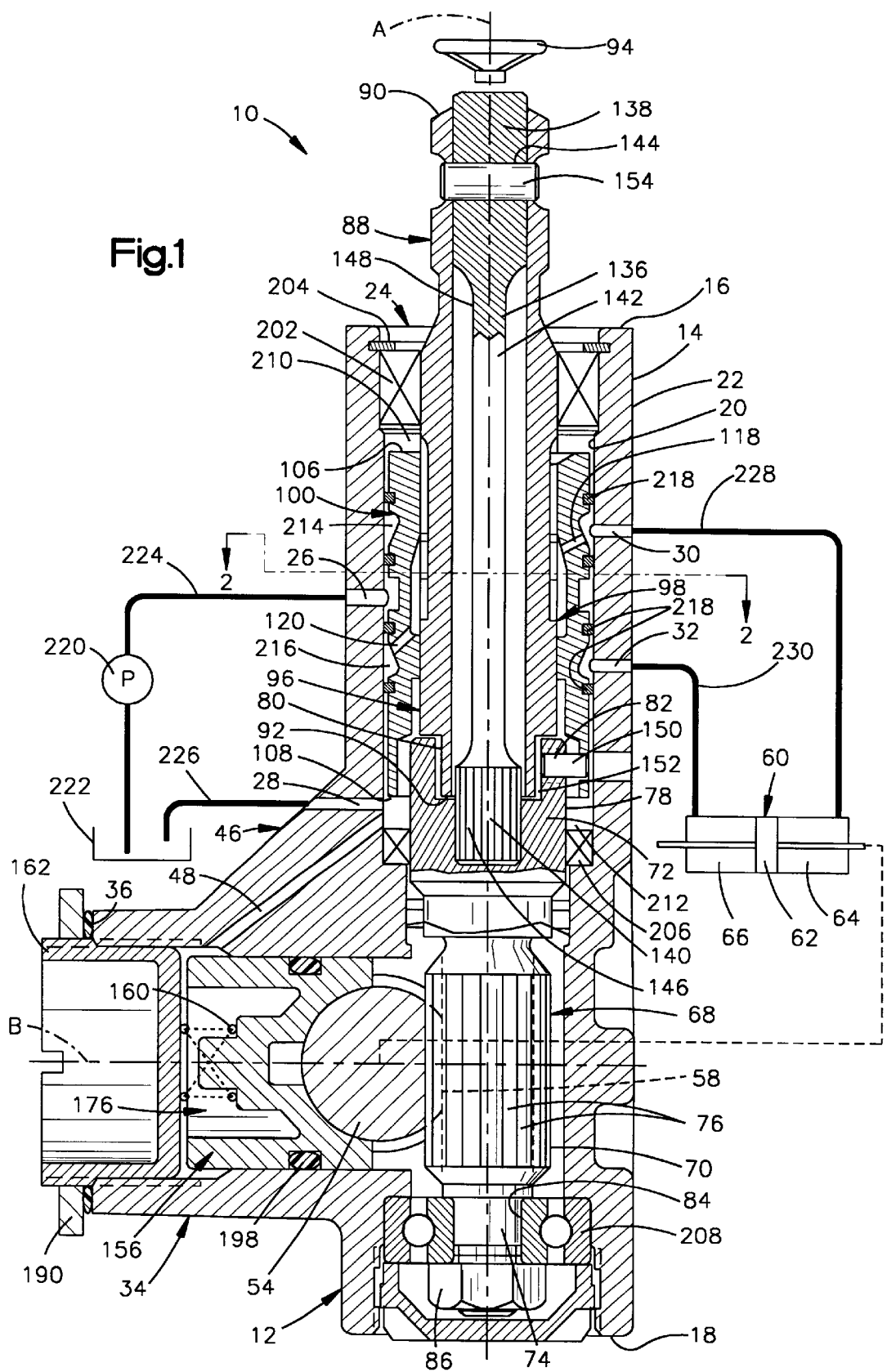
FIG. 1 is a cross-sectional view of a rack and pinion steering gear constructed in accordance with the present invention.

FIG. 1 is a sectional view of a rack and pinion steering gear 10 constructed in accordance with the present invention. The rack and pinion steering gear 10 of FIG. 1 is a hydraulic power-assisted rack and pinion steering gear.

The rack and pinion steering gear 10 includes a housing 12. The housing 12 has a first tubular portion 14 that extends along axis A. The first tubular portion 14 has first and second axial ends 16 and 18, respectively, and cylindrical inner and outer surfaces 20 and 22, respectively. The inner surface 20 of the first tubular portion 14 of the housing 12 defines a passage 24 that extends through the first tubular portion 14. Four radially extending openings extend from the inner surface 20 to the outer surface 22 of the first tubular portion 14. The openings include a fluid inlet opening 26, a fluid outlet opening 28, and first and second motor openings 30 and 32, respectively.

Figure 1A:
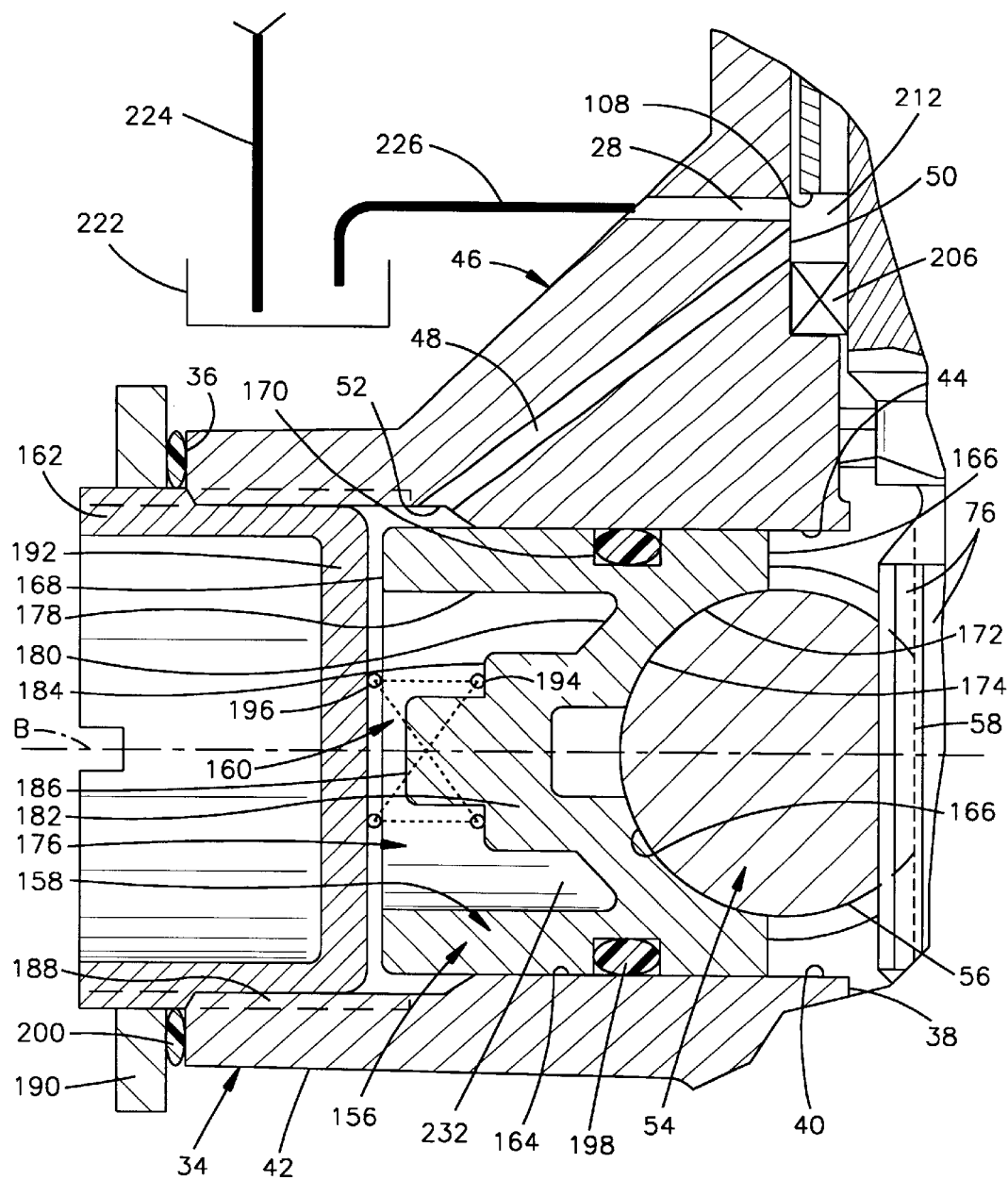
FIG. 1A is an enlarged portion of the rack and pinion steering gear of FIG. 1.

The housing 12 also includes a second tubular portion 34. The second tubular portion 34 extends perpendicular to the first tubular portion 14 along axis B. As shown in FIG. 1A, the second tubular portion 34 has first and second ends 36 and 38, respectively, and inner and outer surfaces 40 and 42, respectively. The second end 38 of the second tubular portion 34 unites with the first tubular portion 14 near the second axial end 18 of the first tubular portion 14. The inner surface 40 of the second tubular portion 34 defines a yoke bore 44. The yoke bore 44 mates with the passage 24 of the first tubular portion 14 near the second axial end 18 of the first tubular portion 14. The inner surface 40 of the second tubular portion 34, adjacent the first end 36, is threaded, illustrated schematically in FIGS. 1 and 1A.

A thickened wall portion 46 of the housing 12 is formed where the first tubular portion 14 mates with the second tubular portion 34. The thickened wall portion 46 is located between the fluid outlet opening 28 of the first tubular portion 14 and the second tubular portion 34 of the housing 12. A fluid passage 48 extends through the thickened wall portion 46 and connects the passage 24 of the first tubular portion 14 to the yoke bore 44 of the second tubular portion 34. Preferably, the fluid passage 48 is cast into the thickened wall portion 46 of the housing 12. As shown in FIGS. 1 and 1A, the fluid passage 48 has first and second ends 50 and 52, respectively. The first end 50 of the fluid passage 48 terminates in the passage 24 of the first tubular portion 14. The second end 52 of the fluid passage 48 terminates in the yoke bore 44.

A longitudinally extending rack bar 54 extends through the housing 12 in a direction that is perpendicular to both axis A and axis B. The rack bar 54 has a generally circular cross-sectional shape that is defined by a generally cylindrical outer surface 56 (FIG. 1A). An upper surface 58 of the rack bar 54 includes a plurality of teeth (not shown).

Opposite end portions (not shown) of the rack bar 54 are connectable with steerable wheels (not shown) of a vehicle (not shown). Movement of the rack bar 54 in a longitudinal direction relative to the housing 12 results in the turning of the steerable wheels of the vehicle.

A hydraulic motor 60, shown schematically in FIG. 1, is also formed in the housing 12. The hydraulic motor 60 includes a piston 62, which is attached to the rack bar 54. The piston 62 separates two variable volume chambers 64 and 66, respectively. One chamber 64 or 66 is located on each side of the piston 62. The hydraulic motor 60 is actuated when a differential pressure arises between the two chambers 64 and 66. The hydraulic motor 60 discontinues operation when the pressure between the two chambers 64 and 66 equalizes. When the hydraulic motor 60 is actuated, fluid pressure moves the piston 62. Movement of the piston 62 results in movement of the rack bar 54 in the longitudinal direction relative to the housing 12.

As shown in FIG. 1, a pinion gear 68 includes a gear portion 70, a first support portion 72, and a second support portion 74. The gear portion 70 has a plurality of teeth 76 for meshingly engaging the teeth of the rack bar 54. The first support portion 72 of the pinion gear 68 forms a first axial end of the pinion gear 68. The first support portion 72 includes a cylindrical outer surface 78. An axially extending cavity 80 extends into the first support portion 72. A hole, shown generally at 82, extends radially through the first support portion 72 and terminates at the cavity 80.

The second support portion 74 of the pinion gear 68 forms a second axial end of the pinion gear 68. The second support portion 74 has a cylindrical outer surface 84. The diameter of the second support portion 74 of the pinion gear 68 is less than the diameter of the first support portion 72. An end of the cylindrical outer surface 84 of the second support portion 74, opposite the gear portion 70, is threaded for receiving a pinion nut 86.

An input shaft 88 includes first and second axial ends 90 and 92, respectively. The first axial end 90 of the input shaft 88 is connectable with a steering wheel 94 of the vehicle. The second axial end 92 of the input shaft 88 includes a valve core part 96.

Figure 2:
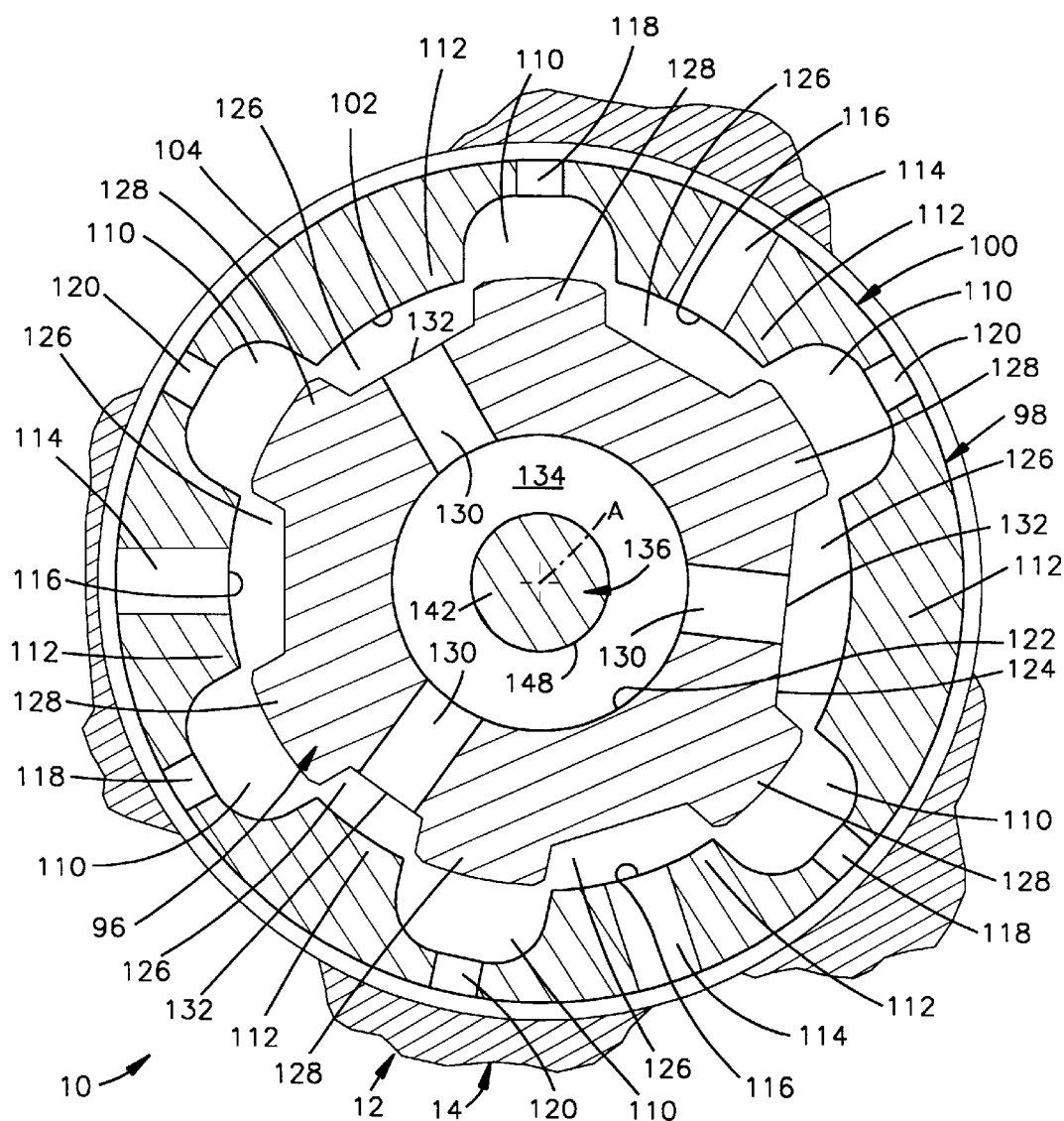
FIG. 2 is a view taken approximately along line 2—2 in FIG. 1.

The rack and pinion steering gear also includes a valve assembly, shown generally at 98. The valve assembly 98 includes a valve sleeve part 100 and the valve core part 96. The valve sleeve part 100 of the valve assembly 98 of the rack and pinion steering gear 10 is tubular. FIG. 2 shows a cross-section of the valve sleeve part 100. For clarity, FIG. 2 shows the structure of the valve sleeve part 100 in a single plane. The valve sleeve part 100 includes inner and outer surfaces 102 and 104, respectively, and first and second axial ends 106 and 108, respectively (FIG. 1). An inner surface 102 of the valve sleeve part 100 includes six axially extending grooves 110 (FIG. 2). The six axially extending grooves 110 define six lands 112. Three radially extending passages 114 extend between the inner surface 102 of the valve sleeve part 100 and the outer surface 104 of the valve sleeve part 100. A port 116 for each passage 114 on the inner surface 102 of the valve sleeve part 100 is centrally located upon a land 112, equidistant from adjacent grooves 110.

A first set of passages 118 extends radially outwardly through the valve sleeve part 100. The first set of passages includes three passages 118. Only one of the passages is shown in FIG. 1. One passage 118 from the first set of passages 118 is located in each groove 110 that is located immediately counterclockwise of a radially extending passage 114.

A second set of passages 120 extends radially outwardly through the valve sleeve part 100. The second set of passages 120 includes three passages 120. Only one of the passages 120 is shown in FIG. 1. One passage 120 from the second set of passages 120 is located in each groove 110 immediately clockwise of a radially extending passage 114.

The valve core part 96 is tubular and includes inner and outer surfaces 122 and 124, respectively. FIG. 2 also shows a cross-section of the valve core part 96. For clarity, FIG. 2 shows the structure of the valve core part 96 in a single plane. The outer surface 124 of the valve core part 96 includes six axially extending grooves 126. The axially extending grooves 126 define six lands 128. The valve core part 96 also includes three radially extending passages 1 30 that extend between the outer surface 124 and the inner surface 122 of the valve core part 96. Each radially extending passage 130 has a port 132 that is located in an axially extending groove 126 of the valve core part 96, equidistant from adjacent lands 128. The inner surface 122 of the valve core part 96 defines an axially extending passage 134.

A torsion bar 136 (FIG. 1) includes first and second axial end portions 138 and 140, respectively, and an intermediate portion 142. The first axial end portion 138 is cylindrical. A radially extending hole 144 extends through the first axial end portion 138. The second axial end portion 140 is also generally cylindrical and includes a splined outer surface 146. The intermediate portion 142 of the torsion bar 136 is elongated and has a cylindrical outer surface 148 (FIG. 2). The cylindrical outer surface 148 of the intermediate portion 142 has a diameter that is approximately one-half the diameter of the first and second axial end portions 138 and 140.

In one method of assembling the valve assembly 98, the second axial end portion 140 of the torsion bar 136 is inserted into the cavity 80 on the first axial end of the first support portion 72 of the pinion gear 68. The splined outer surface 146 of the second axial end portion 140 of the torsion bar 136 fixes the second axial end portion of the torsion bar relative to the pinion gear 68. The second axial end 108 of the valve sleeve part 100 is then fixed to the first support portion 72 of the pinion gear 68 with a pin 150 that extends through the radially extending hole 82 in the first support portion 72 of the pinion gear 68. The input shaft 88 is then disposed between the valve sleeve part 100 and the torsion bar 136. When properly positioned between the valve sleeve part 100 and the torsion bar 136, a small, annular passage 152 located within the cavity 80 of the first support portion 72 of the pinion gear 68 extends around the second axial end 92 of the input shaft 88. The first axial end portion 138 of the torsion bar 136 is then fixed to the input shaft 88 using a pin 154.

The rack and pinion steering gear 10 also includes a yoke assembly 156. As shown in FIG. 1A, the yoke assembly 156 includes a yoke bearing 158, a spring 160, and a yoke plug 162. The yoke bearing 158 includes a cylindrical side wall 164 and axially opposite first and second surfaces 166 and 168, respectively. The cylindrical side wall 164 includes a circumferentially extending groove 170.

The first surface 166 of the yoke bearing 158 is generally flat and extends in a plane that is perpendicular to axis B. A recess 172 extends into the first end surface 166 of the yoke bearing 158. The recess 172 is defined by an arcuate recess surface 174. Preferably, the arc of the recess surface 174 is partially cylindrical with a radius that is equal to the radius of the outer surface 56 of the rack bar 54. In one embodiment, the recess surface 174 is a dual radius surface for making line contact with the outer surface 56 of the rack bar 54.

The second end surface 168 of the yoke bearing 158 is generally flat and extends in a plane that is parallel to the plane of the first end surface 166. A recess 176 extends from the second end surface 168 into the yoke bearing 158. An opening to the recess 176 is circular and is located in the plane of the second end surface 168. The circular opening is coaxial with the cylindrical side wall 164 o f t he yoke bearing 158. A cylindrical side wall 178 and an end wall 180 define the recess 176. The side w all 178 extends in a direction that is perpendicular to the second end surface 168. A cylindrical spring guide 182 extends outwardly of the end wall 180 of the recess 176. The spring guide 182 is centered in the recess 176 and includes a first radially extending surface 184 for supporting a portion of the spring 160. The spring guide 182 terminates at a radially extending end wall 186. The end wall 186 is located axially outwardly of the first radial surface 184 and within the recess 176.

The yoke plug 162 is cup-shaped and includes a threaded outer surface 188, an annular flange 190, and a generally flat end wall 192. Although not shown in FIG. 1, a cylindrical spring guide may extend outwardly, along axis B, of the end wall 192 of the yoke plug 162. The spring 160 of the yoke assembly illustrated in FIG. 1 is a helical compression spring. The spring 160 has a first axial end 194 and an opposite second axial end 196. The spring 160 also has a known spring constant.

The yoke assembly 156 also includes two fluid-tight seals 198 and 200. The seals 198 and 200 are preferably O-rings. A first seal 198 is designed to seal between the cylindrical side wall 164 of the yoke bearing 158 and the inner surf ace 40 of the second tubular portion 34 of the housing 12. A second seal 200 is designed to seal between the flange 190 of the yoke plug 162 and the first end 36 of the second tubular portion 34 of the housing 12.

According to one method of assembling the rack and pinion steering gear 10, the rack bar 54 is extended longitudinally through the housing 12 so that teeth of the rack bar are located within the housing. The assembled valve assembly 98 is then inserted into the passage 24 of the first tubular portion 14 of the housing 12. The valve assembly 98 is placed in the first tubular portion 14 so that teeth 76 of the gear portion 70 of the pinion gear 68, which is attached to the assembled valve assembly 98, meshingly engage teeth of the rack bar 54 and so that the input shaft 88, which is also attached to the assembled valve assembly 98, extends axially outwardly of the opening on the first axial end 16 of the first tubular portion 14.

As shown in FIG. 1, the rack and pinion steering gear 10 includes three bearing assemblies. A first bearing assembly 202 is located adjacent the opening at the first axial end 16 of the first tubular portion 14 of the housing 12. The first bearing assembly 202 extends between the housing 12 and the input shaft 88 and enables rotation of the input shaft relative to the housing. A retaining ring 204 holds the first bearing assembly 202 in the first tubular portion 14 of the housing 12.

A second bearing assembly 206 is located in the passage 24 of the first tubular portion 14 between the fluid outlet opening 28 and the yoke bore 44. The second bearing assembly 206 extends between the housing 12 and the first support portion 72 of the pinion gear 68 and enables rotation of the pinion gear relative to the housing.

A third bearing assembly 208 is located in the passage 24 of the first tubular portion 14 between the yoke bore 44 and the second axial end 18 of the first tubular portion. The third bearing assembly 208 extends between the housing 12 and the second support portion 74 of the pinion gear 68 and enables rotation of the pinion gear relative to the housing. The third bearing assembly 208 is held in the housing 12 and relative to the pinion gear 68 by a pinion nut 86 that is screwed onto the threads of the second support portion 74.

The first seal 198 is then inserted into the groove 170 (FIG. 1A) in the side wall 164 of the yoke bearing 158 and the yoke bearing is inserted into the yoke bore 44 of the second tubular portion 34 of the housing 12. When properly inserted, the recess surface 174 of the yoke bearing 158 will contact the outer surface 56 of the rack bar 54 in a location opposite the teeth 76 of the gear portion 70 of the pinion gear 68. The spring 160 is then placed on the spring guide 182 (FIG. 1A) of the yoke bearing 158 so that the first axial end 194 of the spring 160 contacts the first radially extending surface 184 of the spring guide 182. The second seal 200 (FIG. 1A) is placed around the outer surface 188 of the yoke plug 162 and the yoke plug is screwed into the first end 36 of the second tubular portion 34 of the housing 12. When the yoke plug 162 is screwed into the housing 12, the second seal 200 creates a fluid-tight seal between the annular flange 190 of the yoke plug 162 and the first end 36 of the second tubular portion 34 of the housing 12. The end wall 192 of the yoke plug 162 contacts the second axial end 196 of the spring 160 and compresses the spring. The yoke plug 162 may be screwed into the housing 12 a distance necessary to compress the spring 160 a predetermined amount.

When the rack and pinion steering gear 10 is assembled, four annular channels are formed between the valve sleeve part 100 and the inner surface 20 of the first tubular portion 14 of the housing 12. As shown in FIG. 1, the four annular channels include an annular inlet channel 210, an annular outlet channel 212, and an annular first and second motor channels 214 and 216, respectively. Fluid-tight seals 218, four of which are shown in FIG. 1, seal each of the four channels 210–216 from adjacent channels 210–216.

A pump 220 (FIG. 1) draws hydraulic fluid from a reservoir 222 and supplies the hydraulic fluid to the rack and pinion steering gear 10. Conduit 224 extends between pump 220 and the fluid inlet opening 26 of the housing 12 for carrying fluid from the pump 220 to the rack and pinion steering gear 10. Conduit 226 extends from the fluid outlet opening 28 of housing 12 to the reservoir 222 for returning hydraulic fluid to the reservoir. The rack and pinion steering gear 10 also includes conduit 228 that extends from the first motor opening 30 to chamber 64 of the hydraulic motor 60 and conduit 230 that extends from the second motor opening 32 to chamber 66. As shown in FIG. 1, conduit 228 provides fluid communication between the first annular motor channel 214 and chamber 64 of the hydraulic motor 60. Conduit 230 provides fluid communication between the second annular motor channel 216 and chamber 66 of the hydraulic motor 60. Fluid flow through conduits 228 and 230 is bi-directional. Thus, when the volume of chamber 64 of the hydraulic motor 60 is increasing, fluid flows through conduit 228 toward the hydraulic motor and through conduit 230 away from the hydraulic motor. When the volume of chamber 64 of the hydraulic motor is decreasing, fluid flows through conduit 230 toward the hydraulic motor 60 and through conduit 228 away from the hydraulic motor.

Each conduit 224 and 226 used in the rack and pinion steering gear 10 is formed from a flexible material. Preferably, each conduit 224 and 226 is formed from rubber. By using flexible conduits, noise caused by varying pressure fluid flow through the conduits 224 and 226 is reduced. However, the flexible wall conduits also have pressure variable capacities. When subjected to high pressure, flexible wall conduits swell, or increase slightly in diameter. As a result, the fluid capacity of a respective conduit increases when the conduit is subjected to increased pressure.

When the rack and pinion steering gear 10 is mounted in a vehicle, the input shaft 88 is operatively coupled to the steering wheel 94 of the vehicle. Rotation of the steering wheel 94 results in rotation of the input shaft 88. Since the input shaft 88 is fixed relative to the first axial end portion 138 of the torsion bar 136, rotation of the input shaft 88 results in rotation of the first axial end portion 138 of the torsion bar. If resistance to the turning of the steerable wheels of the vehicle is above a threshold level, the second axial end portion 140 of the torsion bar 136 will not be rotated by rotation of the first axial end portion 138 of the torsion bar. As a result, rotation of the first axial end portion 138 of the torsion bar 136 relative to the second axial end portion 140 will cause torsion or twisting of the intermediate portion 142 of the torsion bar. Torsion of the intermediate portion 142 of the torsion bar 136 causes the valve core part 96 to move relative to the valve sleeve part 100.

FIG. 2 illustrates the valve assembly 98 in a neutral or unactuated position. In the neutral position, hydraulic fluid flows from the annular inlet channel 210 (FIG. 1) and radially inwardly through the radially extending passages 114 in the valve sleeve part 100. An equal amount of fluid is directed toward the first and second sets of passages 118 and 120. The first set of passages 118 directs fluid to the first annular motor channel 214 and the second set of passages .120 directs fluid to the second annular motor channel 216. Since an equal amount of fluid is directed toward each channel 214 and 216, the pressure within chamber 64 of the hydraulic motor 60 remains equal to the pressure within chamber 66 of the hydraulic motor.

When the valve assembly 98 is in the neutral position and the pressure in the two chambers 64 and 66 of the hydraulic motor 60 is equal, fluid that flows into the valve assembly through the radially extending passages 114 in the valve sleeve part 100 is directed toward the radially extending passages 130 in the valve core part 96. This is due to the fluid being incompressible and the chambers 64 and 66 of the hydraulic motor 60, the first and second motor conduits 228 and 230, and the first and second annular motor channels 214 and 216 being filled to capacity with fluid. The fluid flows through the radially extending passages 130 in the valve core part 96 and into the passage 134 formed by the inner surface 122 of the valve core part 96. The fluid then flows through passage 134, through passage 152 (FIG. 1), and into the annular outlet channel 212.

When the valve core part 96 is rotated relative to the valve sleeve part 100, i.e. the intermediate portion 142 of the torsion bar 136 is twisted, the valve assembly 98 moves out of the neutral position, or is actuated, and fluid is directed toward a respective set of passages 118 or 120. For example, with reference to FIG. 2, if the input shaft 88 is rotated clockwise relative to the valve sleeve part 100, land s 128 of the valve core part 96 move adjacent lands 112 of the valve sleeve part 100 and fluid flow toward the first set of passages 118 is restricted. Conversely, fluid flow toward the second set of passages 120 is increased.

This movement of the valve core part 96 relative to the valve sleeve part 100 also blocks the fluid flow to the radially extending passages 130 of the valve core part 96, i.e., the return. As a result, fluid pressure increases in conduit 224, in the annular inlet channel 210, in the second set of passages 120, in the second annular motor channel 216, in conduit 230, and in chamber 66 of the hydraulic motor 60.

A higher pressure in chamber 66 relative to the pressure in chamber 64 results in a differential pressure that causes the piston 60 to move. When the piston 60 moves, the rack bar 54 moves and the steerable wheels are turned.

As the volume of chamber 66 increases, the volume of chamber 64 decreases. Fluid flows out of chamber 64, through conduit 228, and into the first annular motor channel 214 (FIG. 1). Fluid then flows through the first set of passages 118 (FIG. 2) from the first annular motor channel 214. The fluid flows through the radially extending passages 130 in the valve core part 96 and into the passage 134 formed by the inner surface 122 of the valve core part 96. The fluid then flows through passage 134, through passage 152 (FIG. 1), and into the annular outlet channel 212.

During movement of the rack bar 54 relative to the housing 12, interaction of teeth of the rack bar 54 with teeth 76 of the gear portion 70 of the pinion gear 68 rotates the pinion gear. Rotation of the pinion gear 68 rotates the valve sleeve part 100 relative to the valve core part 96. As a result, movement of the rack bar 54 rotates the valve assembly 98 back into the neutral position. When the valve assembly 98 is in the neutral position, fluid is again directed from the radially extending passages 114 in the valve sleeve part 100 to the radially extending passages 130 in the valve core part 96 and to the annular outlet channel 212 to be returned to the reservoir 222.

As shown in FIG. 1A, the first end 50 of the fluid passage 48 that extends through the thickened wall portion 46 of the housing 12 terminates in the annular outlet channel 212. The fluid outlet opening 28 in the housing 12 also connects to the annular outlet channel 212. When the rack and pinion steering gear 10 is operating and fluid is received in the annular outlet channel 212, fluid flows through the fluid passage 48 in the thickened wall portion 46 and into a pressure chamber 232 located in the yoke bore 44. Once the fluid passage 48 and the pressure chamber 232 are filled with fluid, additional fluid received in the annular outlet channel 212 flows through the fluid outlet opening 28 and into conduit 226 to be returned to the reservoir 222.

The amount of fluid flowing through conduit 226 is dependent upon the fluid capacity of conduit 226. When more fluid is directed toward the annular outlet channel 212 than can flow through conduit 226, fluid pressure in the annular outlet channel 212, also known as the return pressure, increases. The return pressure increases when the valve assembly 98 rotates from an actuated position in which fluid is directed toward a particular set of passages 118 or 120 to an unactuated or neutral position. When the valve assembly 98 is in the actuated condition, fluid pressure increases in conduit 224. As a result, conduit 224 swells and retains a greater capacity of fluid. When the valve assembly 98 returns to the neutral position, the pressure in conduit 224 decreases and an increased amount of fluid is suddenly directed toward the annular outlet channel 212. If the amount of fluid directed to the annular outlet channel 212 is greater than the capacity of conduit 226, the fluid pressure in the annular outlet channel 212 increases.

The fluid pressure in the annular outlet channel 212 is also related to the velocity of the rack bar 54 toward a desired position. The desired position is the position of the rack bar 54 relative to the housing 12 for removing torsion from the torsion bar 136 and returning the valve assembly 98 to the neutral position. Thus, the velocity of the rack bar 54 is also directly related to the rotational velocity of the valve assembly 98 from an actuated position toward the neutral or unactuated position. If the rack bar 54 moves slowly toward the neutral position, the valve sleeve part 100 moves slowly relative to valve core part 96 when moving toward the neutral position. The slow relative movement between the valve sleeve part 100 and the valve core part 96 results in a gradual increase in fluid flow to the radially extending passages 130 of the valve core part 96 and toward the annular outlet channel 212. The gradual increase in fluid flow toward the annular outlet channel 212, slowly relief the pressure in conduit 224 and provides conduit 226 with time to return the fluid to the reservoir 222 without a large pressure increase in the annular outlet channel 212. As a result, slow movement of the rack bar 54 toward the desired position results in a small increase of fluid pressure in the annular outlet channel 212.

Conversely, if the rack bar 54 moves quickly toward the neutral position, the valve sleeve part 100 moves quickly relative to the valve core part 96 when moving toward the neutral position. The quick relative movement results in a quick opening of the radially extending passages 130 of the valve core part 96 and a sudden release of pressure in conduit 224. As a result of the sudden release of pressure in conduit 224, a large amount of fluid is suddenly directed toward the annular outlet channel 212. If the amount of fluid is greater than the capacity of conduit 226, fluid pressure in the annular outlet channel 212 suddenly increases. The fluid pressure remains at the increased level until conduit 226 returns enough of the fluid to the reservoir 222 to again reduce the fluid pressure in the annular outlet channel 212.

Since the fluid is incompressible, when pressure in the annular outlet channel 212 increases, fluid pressure in the pressure chamber 232 of the yoke bore 44 increases. The fluid pressure in the pressure chamber 232 acts on a working surface of the yoke bearing 158 to force the yoke bearing toward the rack bar 54. The working surface of the yoke bearing 158 includes surfaces of the yoke bearing that are subjected to fluid pressure and that do not extends parallel to axis B. For example, in the yoke bearing 158 illustrated in FIG. 1, the working surface of the yoke bearing 158 includes the second end surface 168 of the yoke bearing, the end wall 180, the first radially extending surface 184, and the spring guide end wall 186. The load or pressure exerted by the yoke bearing 158 on the rack bar 54 varies with the fluid pressure in the pressure chamber 232. The force exerted on the rack bar 54 also varies as a function of the working surface of the yoke bearing 158 upon which the fluid pressure acts. Thus, the working surface of the yoke bearing 158 may be designed with a predetermined surface area for providing a predetermined range of forces on the rack bar 54.

Recess surface 174 of the yoke bearing 158 contacts the outer surface 56 of the rack bar 54. Recess surface 174 of the yoke bearing 158 also has a known coefficient of friction. By varying the load, or pressure, applied on the rack bar 54 by the yoke bearing 158, i.e., the normal load, the friction between the rack bar 54 and the yoke bearing 158 is varied.

The friction between the rack bar 54 and the yoke bearing 158 acts in a direction opposite the inertial force that causes the rack bar to oscillate about the desired position. The friction acts on the rack bar 54 to reduce the acceleration of the rack bar during movement toward the desired position. By reducing the acceleration of the rack bar 54, the inertial force is decreased and an amount, or magnitude, of overshoot of the desired position may be decreased or eliminated. As a result, the oscillation of the rack bar 54 is dampened.

A particular advantage of the present invention is that the load between the rack bar 54 and the yoke bearing 158 varies as a function of the velocity of the rack bar 54. Slower rack bar 54 velocity, which would tend to result in a smaller overshoot of the desired position, results in a generally low fluid pressure in the pressure chamber 232 and a generally low load or pressure applied by the yoke bearing 158 on the rack bar 54. Increased rack bar 54 velocity, which would tend to result in a larger overshoot of the desired position, results in a generally high fluid pressure in the pressure chamber 232 and a generally high load of the yoke bearing 158 on the rack bar 54. Since friction generally increases as the load on the rack bar 54 increases, the amount of dampening generally increases as the rack bar velocity increases.

Figure 3:
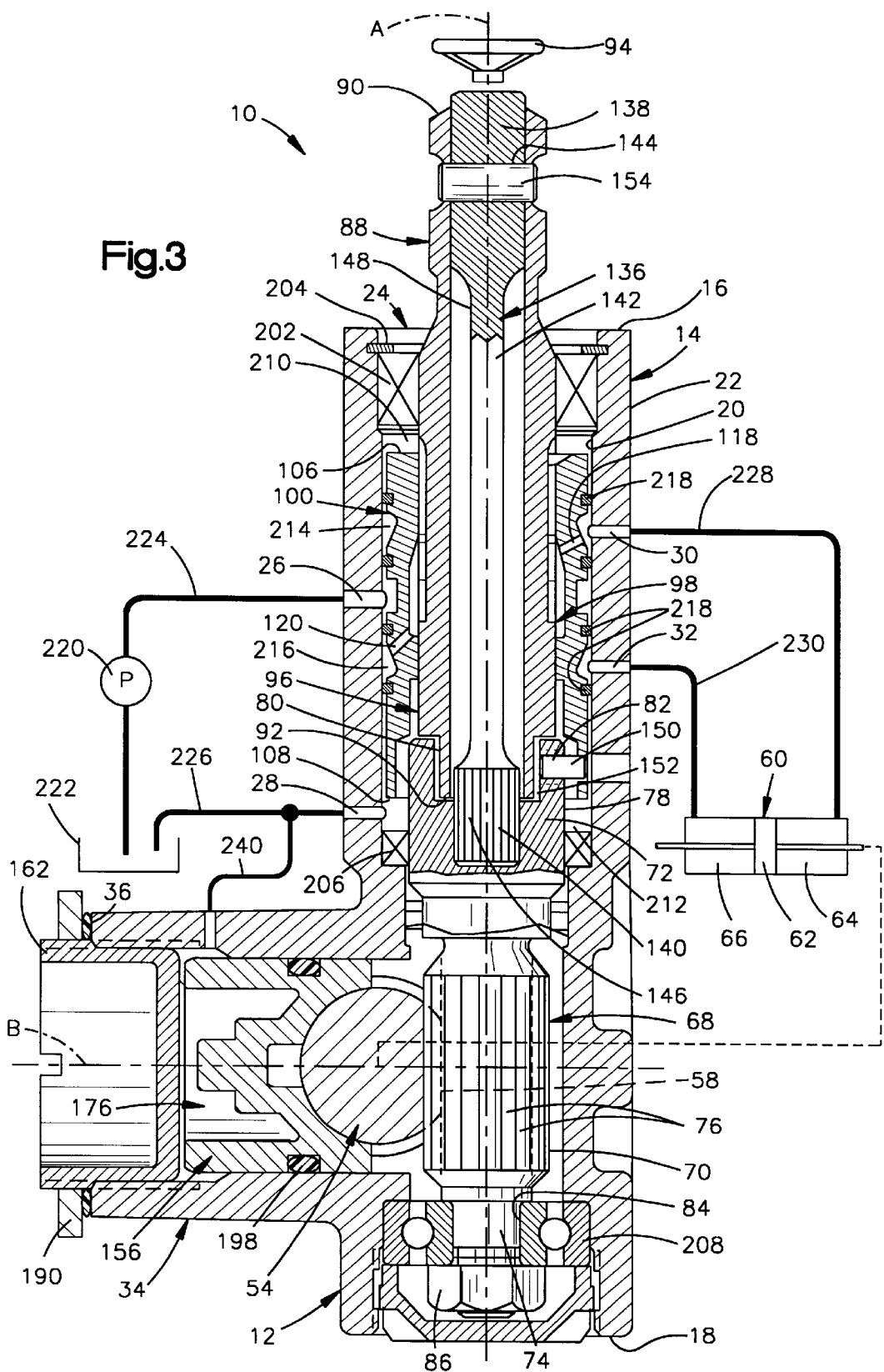
FIG. 3 is a cross-sectional view of a rack and pinion steering gear constructed in accordance with a second embodiment of the present invention.

FIG. 3 illustrates a rack and pinion steering gear 10 constructed in accordance with a second embodiment of the present invention. Structures of FIG. 3 that are the same as, or similar to, structures of FIG. 1 will be referred to with the same reference numerals as in FIG. 1.

Figure 3A:
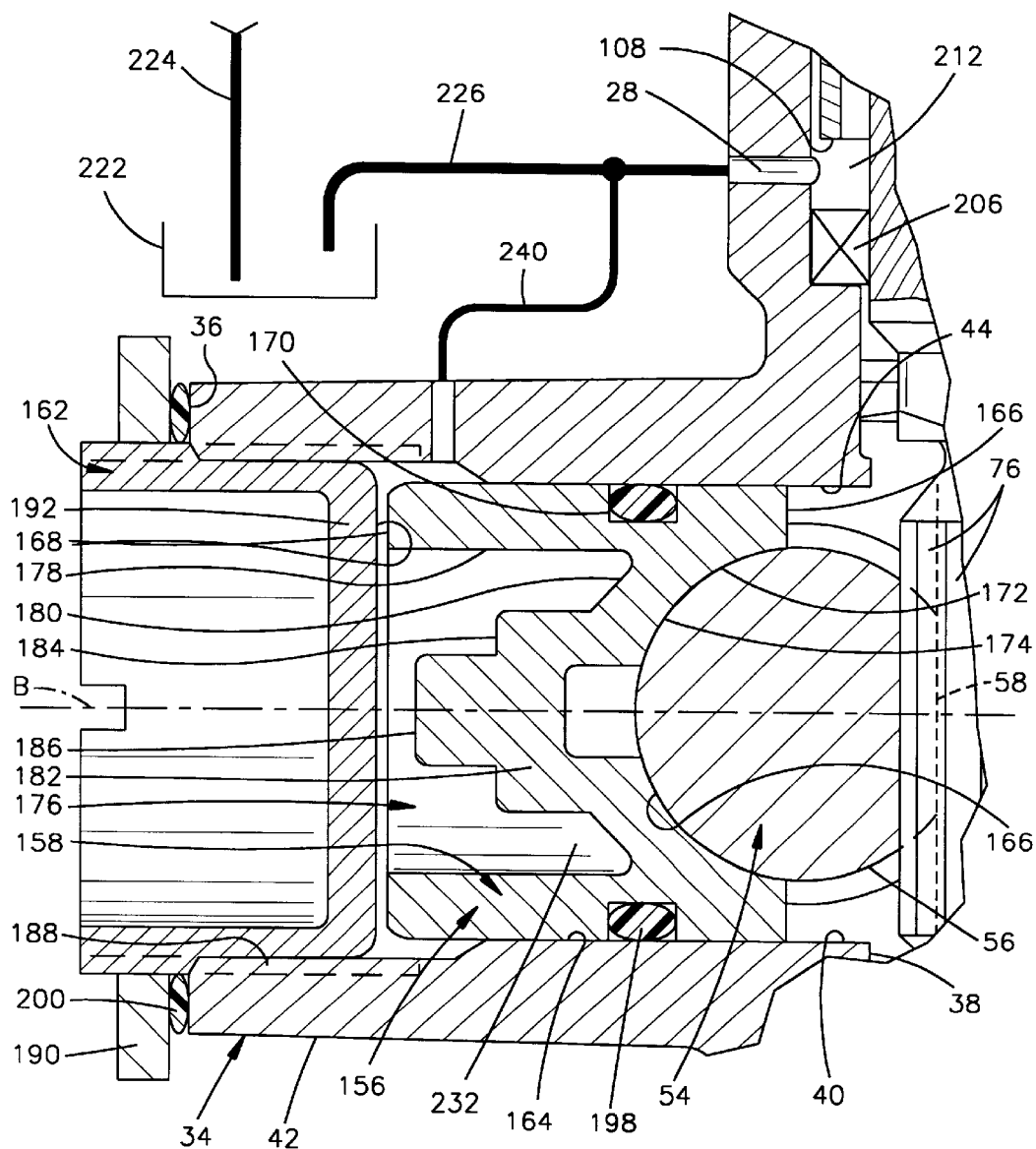
FIG. 3A is an enlarged portion of the rack and pinion steering gear of FIG. 3.

The rack and pinion steering gear 10 of FIG. 3 is identical to the rack and pinion steering gear 10 of FIG. 1 with two exceptions. First, the housing 12 of FIG. 3 does not include a thickened wall portion 46 having a fluid passage 48. Instead, the pressure chamber 232 (FIG. 3A) is pressurized by conduit 240. Conduit 240 branches off of conduit 226 and is subjected to the pressure of fluid in the annular outlet chamber 212. As an alternate to conduit 240 branching off of conduit 226, conduit 240 may be connected directly to the annular outlet channel 212 through an additional opening through the first tubular portion 14 of the housing 12. Second, the yoke assembly 156 of FIG. 3 does not include a spring 160. Thus, the load applied to the rack bar 54 by the yoke bearing 158 is only the load resulting from the fluid pressure in the pressure chamber 232.

From the above description of the invention, those skilled in the art will perceive improvements, changes and modifications. Such improvements, changes and modifications within the skill of the art are intended to be covered by the appended claims.

Having described the invention, I claim the following:

1. An apparatus for turning steerable wheels of a vehicle in response to rotation of a steering wheel, the apparatus comprising:
    a housing;
    a rack bar movable longitudinally relative to the housing for turning the steerable wheels, the rack bar having a portion that extends through the housing and opposite ends that are connectable to the steerable wheels, the portion extending through the housing including teeth;
    a pinion gear located within the housing and including teeth, teeth of the pinion gear being in meshing engagement with teeth of the rack bar;
    a hydraulic motor for, when actuated, moving the rack bar relative to the housing;
    a valve assembly responsive to rotation of the steering wheel for directing fluid to the hydraulic motor, the valve assembly having an actuated position for actuating the hydraulic motor and an unactuated position for discontinuing operation of the hydraulic motor; and
    a mechanism for dampening longitudinal oscillations of the rack bar, the mechanism comprising a yoke bearing contacting the rack bar with a variable pressure that is dependent upon a velocity of rack bar relative to the housing.

2. The apparatus as defined in claim 1 wherein the mechanism further comprises a pressure chamber for receiving fluid, fluid pressure in the pressure chamber acting on the yoke bearing to force the yoke bearing against the rack bar.

3. The apparatus as defined in claim 2 wherein the velocity of the rack bar affects a rotational velocity of the valve assembly, the rotational velocity of the valve assembly affecting a pressure in the pressure chamber.

4. The apparatus as defined in claim 2 wherein the yoke bearing includes a working surface having a predetermined surface area, the working surface being acted upon by fluid pressure in the pressure chamber to apply a predetermined range of forces on the rack bar.

5. The apparatus as defined in claim 1 wherein the housing includes first and second portions, the first portion for receiving the valve assembly and the pinion gear and the second portion for receiving the mechanism, a passage for communicating fluid connecting the first and second portions.

6. The apparatus as defined in claim 5 wherein a thickened wall portion of the housing extends between the first and second portions of the housing, the passage for communicating fluid between the first and second portions of the housing being a fluid passage that is cast into the thickened wall portion.

7. The apparatus as defined in claim 5 wherein the passage for communicating fluid between the first and second portions of the housing is a conduit.

8. The apparatus as defined in claim 5 wherein the mechanism further comprises a pressure chamber for receiving fluid, fluid pressure in the pressure chamber acting on the yoke bearing to force the yoke bearing against the rack bar.

9. The apparatus as defined in claim 8 wherein the pressure chamber is located in the second portion of the housing, opposite ends of the pressure chamber being defined by seals.

10. The apparatus as defined in claim 9 wherein a first seal is located between a yoke plug and the second portion of the housing for defining a first end of the pressure chamber and a second seal is located between the yoke bearing and the second portion of the housing for defining a second end of the pressure chamber.

11. The apparatus as defined in claim 1 wherein fluid is supplied to the valve assembly by a pump, a conduit extending between the pump and the housing for communicating fluid from the pump to the valve assembly, the conduit being formed from a flexible material.

12. The apparatus as defined in claim 11 wherein a fluid capacity of the conduit increases as fluid pressure in the conduit increases.

13. An apparatus for turning steerable wheels of a vehicle in response to rotation of a steering wheel, the apparatus comprising:
    a housing;
    a rack bar movable longitudinally relative to the housing for turning the steerable wheels, the rack bar having a portion that extends through the housing and opposite ends that are connectable to the steerable wheels, the portion extending through the housing including teeth;
    a pinion gear located within the housing and including teeth, teeth of the pinion gear being in meshing engagement with teeth of the rack bar;
    a hydraulic motor for, when actuated, moving the rack bar from an initial position relative to the housing to a desired position relative to the housing in response to rotation of the steering wheel;
    a yoke assembly for supporting and guiding the rack bar relative to the housing, the yoke assembly including a pressure chamber and a yoke bearing, the yoke bearing contacting the rack bar on a side of the rack bar opposite the pinion gear, friction between the yoke bearing and the rack bar increasing in response to an increase in fluid pressure in the pressure chamber; and a fluid source for supplying fluid to the pressure chamber of the yoke assembly, the fluid source increasing fluid pressure in the pressure chamber in response to movement of the rack bar relative to the housing toward the desired position.

14. The apparatus as defined in claim 13 wherein the fluid source is a valve assembly, movement of the rack bar toward the desired position affecting movement of the valve assembly from an actuated position toward an unactuated position, fluid pressure in the pressure chamber increasing in response to movement of the valve assembly toward the unactuated position.

15. The apparatus as defined in claim 14 wherein the fluid pressure in the pressure chamber is partially dependent upon a rotational velocity of the valve assembly toward the unactuated position.

16. The apparatus as defined in claim 13 wherein the yoke bearing includes a working surface having a predetermined surface area, the working surface being acted upon by fluid pressure in the pressure chamber to apply a predetermined range of forces on the rack bar.

17. The apparatus as defined in claim 13 wherein the housing includes a fluid passage for communicating fluid from the fluid source to the pressure chamber.

18. The apparatus as defined in claim 13 further including a conduit for communicating fluid between the fluid source and the pressure chamber.

19. The apparatus as defined in claim 13 wherein opposite ends of the pressure chamber are defined by seals.

20. An apparatus for turning steerable wheels of a vehicle in response to rotation of a steering wheel, the apparatus comprising:

a housing;

a rack bar movable longitudinally relative to the housing for turning the steerable wheels, the rack bar having a portion that extends through the housing and opposite ends that are connectable to the steerable wheels, the portion extending through the housing including teeth;

a pinion gear located within the housing and including teeth, teeth of the pinion gear being in meshing engagement with teeth of the rack bar;

a hydraulic motor for, when actuated, moving the rack bar relative to the housing;

a valve assembly responsive to rotation of the steering wheel for directing fluid to the hydraulic motor, the valve assembly having an actuated position for actuating the hydraulic motor and an unactuated position for discontinuing operation of the hydraulic motor; and a yoke assembly for supporting and guiding the rack bar relative to the housing, the yoke assembly including a pressure chamber and a yoke bearing, the pressure chamber receiving fluid from the valve assembly, the yoke bearing contacting the rack bar on a side of the rack bar opposite the pinion gear;

friction between the yoke bearing and the rack bar increasing as fluid pressure in the pressure chamber increases, fluid pressure in the pressure chamber increasing in response to movement of the valve assembly from the actuated position toward the unactuated position.

21. The apparatus as defined in claim 20 wherein the fluid pressure in the pressure chamber is partially dependent upon a rotational velocity of the valve assembly toward the unactuated position.

22. The apparatus as defined in claim 13 wherein the yoke bearing includes a working surface having a predetermined surface area, the working surface being acted upon by fluid pressure in the pressure chamber to apply a predetermined range of forces on the rack bar.

* * * * *